(12) United States Patent
Che

(10) Patent No.: US 11,429,462 B2
(45) Date of Patent: *Aug. 30, 2022

(54) METHOD AND APPARATUS FOR PEER-TO-PEER MESSAGING IN HETEROGENEOUS MACHINE CLUSTERS

(71) Applicant: Advanced Micro Devices, Inc., Santa Clara, CA (US)

(72) Inventor: Shuai Che, Kirkland, WA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/887,643

(22) Filed: May 29, 2020

(65) Prior Publication Data

US 2020/0293387 A1 Sep. 17, 2020

Related U.S. Application Data

(63) Continuation of application No. 15/474,290, filed on Mar. 30, 2017, now Pat. No. 10,671,459.

(51) Int. Cl.
*G06F 9/54* (2006.01)

(52) U.S. Cl.
CPC .................................. *G06F 9/546* (2013.01)

(58) Field of Classification Search
None
See application file for complete search history.

(56) References Cited

U.S. PATENT DOCUMENTS

| | | | |
|---|---|---|---|
| 6,842,443 B2 | 1/2005 | Allen, Jr. et al. | |
| 7,522,538 B2 | 4/2009 | Rhim et al. | |
| 7,594,236 B2 * | 9/2009 | Jiang | G06F 9/542 719/313 |
| 7,646,779 B2 * | 1/2010 | Kumar | H04L 47/60 370/408 |
| 7,861,249 B2 * | 12/2010 | Jiang | G06F 9/542 719/313 |
| 8,189,612 B2 | 5/2012 | Lemaire et al. | |
| 8,296,459 B1 | 10/2012 | Brandwine et al. | |
| 8,300,641 B1 | 10/2012 | Vincent et al. | |
| 8,621,131 B2 | 12/2013 | Loh et al. | |
| 9,116,809 B2 * | 8/2015 | Asaro | G06F 12/0646 |
| 10,671,459 B2 * | 6/2020 | Che | G06F 9/546 |
| 2003/0189924 A1 | 10/2003 | Kadambi et al. | |
| 2005/0289555 A1 | 12/2005 | Jiang et al. | |
| 2008/0016243 A1 | 1/2008 | Basso et al. | |

(Continued)

OTHER PUBLICATIONS

Darius Buntinas et al.; *Design and Evaluation of Nemesis, a Scalable, Low-Latency, Message-Passing Communication Subsystem*; Mathematics and Computer Science Division, Argonne National Laboratory; Proceedings of the International Symposium on Cluster Computing and the Grid 2006; May 2006; pp. 1-9.

(Continued)

*Primary Examiner* — Umut Onat

(57) ABSTRACT

Various computing network messaging techniques and apparatus are disclosed. In one aspect, a method of computing is provided that includes executing a first thread and a second thread. A message is sent from the first thread to the second thread. The message includes a domain descriptor that identifies a first location of the first thread and a second location of the second thread.

21 Claims, 5 Drawing Sheets

(56) References Cited

U.S. PATENT DOCUMENTS

2012/0319717 A1 12/2012 Chi
2014/0143368 A1 5/2014 Anderson
2016/0139624 A1 5/2016 Orr et al.
2016/0179593 A1* 6/2016 Arimilli ............... G06F 15/167
                                                        719/314

OTHER PUBLICATIONS

HSA Foundation; *Chapter 3 HSA Memory Consistency Model*; 2015; p. 1.

Jeff A. Stuart; et al.; *Message Passing on Data-Parallel Architectures*; in Proceedings of the 23rd IEEE International Parallel and Distributed Processing Symposium, IPDPS 2009, May 2009; pp. 1-12.

Ashwin M. Aji et al.; *MPI-ACC: An Integrated and Extensible Approach to Data Movement in Accelerator-Based Systems*; in 14th IEEE International Conference on High Performance Computing and Communications; Jun. 25, 2012; pp. 1-8.

Dhabaleswar K. (DK) Panda; *MVAPICH2: A High Performance MPI Library for Nvidia GPU Clusters with InfiniBand*; Presentation at GTC 2013; 2013; pp. 1-53.

H. Wang et al.; *MVAPICH2: Optimized GPU to GPU Communication for InfiniBand Clusters*; Presented at International Supercomputing Conference (ISC); Jun. 2011; p. 1.

HSA Foundation; Overview of Grids, Work-Groups, and Work-Items; HSA Programmer's Reference Manual Version 1.0.1, Chapter 2; 2015; pp. 1-3.

HSA Foundation; *Memory Scope*; www.hsafoundation.com/html/Content/PRM/Topics/06_Memory/memory_scope.htm; 2015; p. 1.

Lars Nyland et al.; *Understanding and Using Atomic Memory Operations*; GTC 2013; 2013; pp. 1-61.

Webopedia Definition; *Atomic Operation*; http://www.webopedia.com/TERM/A/atomic_operation.html; Jan. 4, 2017; p. 1.

* cited by examiner

METHOD AND APPARATUS FOR PEER-TO-PEER MESSAGING IN HETEROGENEOUS MACHINE CLUSTERS

This application is a continuation of Ser. No. 15/474,290, filed Mar. 30, 2017.

BACKGROUND OF THE INVENTION

Message passing is a widely-used communication model for multi-processor and multi-node processing. Current examples include the message passing interface (MPI), MPI+OpenCL, and MPI+CUDA. Accelerator-based computing (e.g., graphic processing units or GPUs) has become popular recently, however GPU's are usually not the first-tier entities which are involved in message passing (e.g., today's MPI+OpenCL, and MPI+CUDA models). The MPI+X model is widely adopted today in high performance computing (HPC) environments, where communications rely on the host central processing unit (CPU) across nodes.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
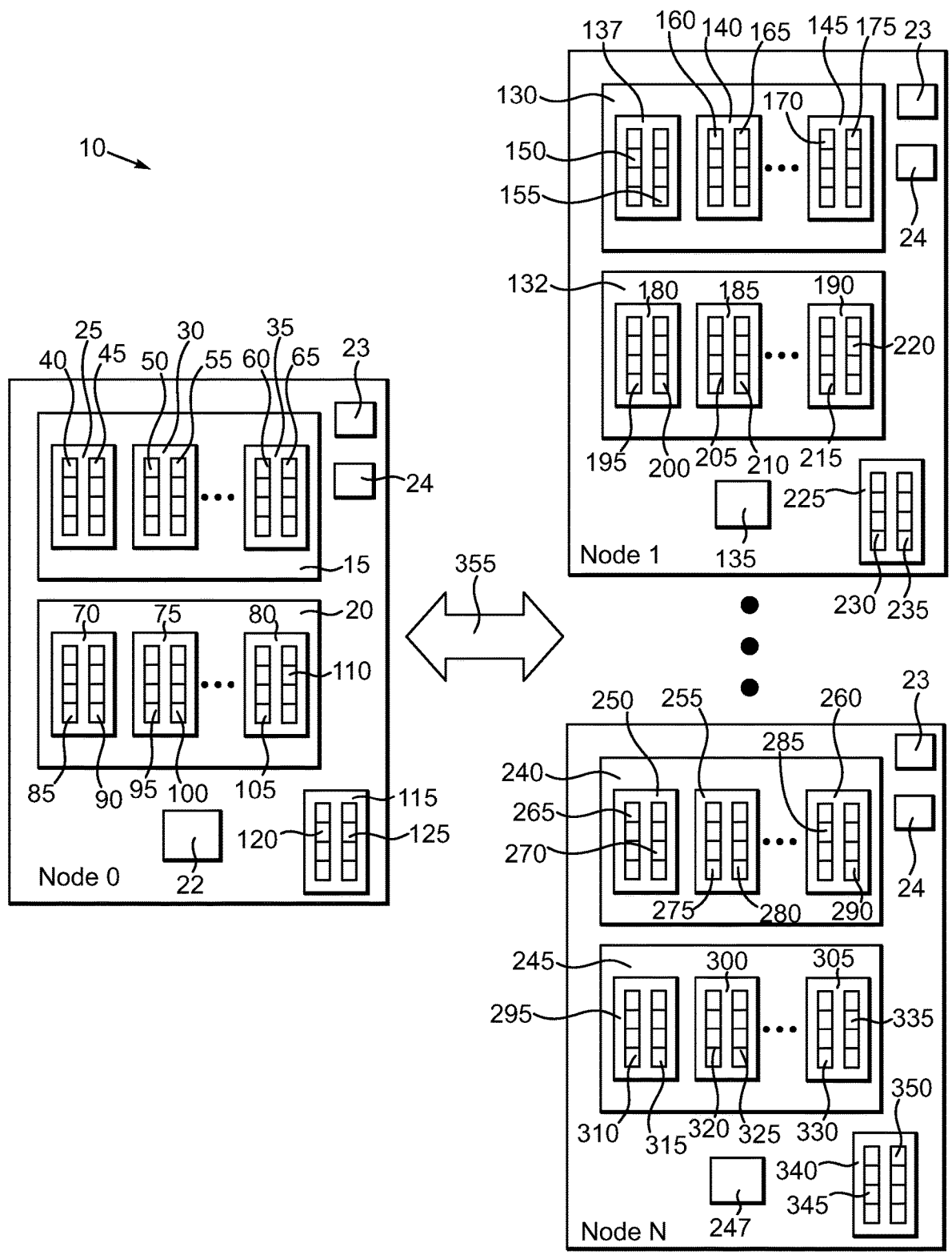
FIG. 1 is a block diagram of an exemplary computing network.

Current techniques and structures to allow GPUs to directly send/receive messages (intra/inter-node) tend be inefficient. As a consequence, programmers have to spend significant effort writing code that appropriately packages data and manages the movement thereof. Heterogenous computing networks usually involve hierarchical architecture. Message traffic in such environments presents the technical challenge of how to identify message senders and receivers. One conventional technique involves the use of ranking to identify particular threads/processes. In a traditional MPI environment, the ranking is achieved by using a rank number (a unique number for a thread/process). However, this may not suffice in newer architectures with more complicated system topologies. One conventional technique tries for improvements by allowing GPUs to participate in message-passing communications. But this technique uses a sleep-based polling system to store and retrieve messages, which is not efficient.

In accordance with one aspect of the present invention, a method of computing is provided that includes executing a first thread and a second thread. A message is sent from the first thread to the second thread. The message includes a domain descriptor that hierarchically identifies a first location of the first thread and a second location of the second thread.

In accordance with another aspect of the present invention, a method of computing in a heterogeneous computing network is provided. The method includes on a first computing node executing a first thread and on a second computing node executing a second thread. A message is sent from the first thread to the second thread. The message includes a domain descriptor that hierarchically identifies a first location of the first thread and a second location of the second thread.

In accordance with another aspect of the present invention, a computing network is provided that includes a first computing node that has a first device operable to run a software application, and while running the software application, executing a first thread and a second thread. The software application includes instructions for sending a message from the first thread to the second thread. The message includes a domain descriptor that hierarchically identifies a first location of the first thread and a second location of the second thread.

Various computing networks with message passing are disclosed. The computing networks can include multiple computing nodes. A node can be a computer with multiple processors, such as a CPU and a GPU or something more integrated, such as an accelerated processing unit or even a system-on-chip. The node(s) is operable to run an application, and while doing so, execute multiple threads. One thread can compose and send a message to another thread in the same node or another node. The software application can include a library of instructions such that messages can be composed with a domain descriptor that hierarchically identifies locations of the sender and receiver. In addition, atomics operations and memory scopes can be incorporated into message composition and transmission. These and other operations can be provided in conjunction with the Heterogeneous System Architecture (HSA) specification and MPI. Additional details will now be described.

In the drawings described below, reference numerals are generally repeated where identical elements appear in more than one figure. Turning now to the drawings, and in particular to FIG. 1, therein is shown a block diagram of an exemplary computing network 10. The computing network 10 includes multiple nodes, Node 0, Node 1 and Node N (hereinafter collectively "Node 0 . . . Node N"). Each of the nodes, Node 0 . . . Node N, is a basic unit in a cluster system and each can consist of processors, memory, interconnects and network interface card (connecting to the network) along with system and application software running on it. The number of nodes Node 0 . . . Node N can be other than three. Node 0 . . . Node N can make up a machine cluster that is heterogeneous or homogeneous. Node 0 can include multiple devices, such as device 15 and device 20. The devices 15 and 20 can be CPUs, GPUs or other processors. If desired, the devices 15 and 20 can be implemented on a single substrate, such as, by way of an accelerated processing unit (APU) or other device. Preferably, the devices 15 and 20 function with shared virtual memory 22. The devices 15 and 20 can be running a software application 23 and operating system software 24. The application 23 can include instructions stored in a non-transitory computer readable medium. The application 23 can be a high performance computing (HPC) application. Examples of such HPC applications include data mining applications, engineering simulation applications, weather simulation applications or the like. At any moment in time while the software application 23 is running, the device 15 can be executing multiple threads 25, 30 and 35 where the actual number can be one or more. The threads 25, 30 and 35 can be dedicated to communications and other threads (not shown) can be dedicated to computations. Intranode message passing is performed by using lock-free queues in the shared virtual memory 22. Internode messaging is performed using lock-free queues in distributed memory, such as multiple shared virtual memories at the node level. A queue can be a FIFO (first in first out) memory allocation set by the software application 23 or the operating system software 24 and the distributed memory environment. Each of the threads 25, 30 and 35 has a receive queue and a free queue in the shared virtual memory 22 (or optionally in hardware). Thus, the thread 25 can be provided with a receive queue 40 and a free queue 45. However, other queue structure solutions are also possible as long as they can be used for sending and receiving messages. The mechanics of message passing will be described in more detail below. The thread 30 can similarly be provided with a receive queue 50 and a free queue 55 and the thread 35 can be provided with a receive queue 60 and a free queue 65. The device 20 can similarly be provided with receive and free queues. However, assume for the purposes of this illustration that the device 20 is configured as a GPU. In this circumstance, rather than threads, the device 20 can, at any moment in time when the application 23 is running, execute multiple workgroups 70, 75 and 80, where each of the workgroups 70, 75 and 80 can consist of multiple wavefronts and each wavefront consists of one or more threads. The workgroup 70 can be provided with a receive queue 85 and a free queue 90, the workgroup 75 can be provided with a receive queue 95 and a free queue 100 and the workgroup 80 can be provided with a receive queue 105 and a free queue 110. In addition, Node 0 can execute a network thread or workgroup 115 that can be provided with a receive queue 120 and a free queue 125. The network thread 115 can run on the devices 15 or 20 or even on a peripheral device or card (not shown).

Still referring to FIG. 1, Node 1 can include multiple devices 130 and 132, which can be configured substantially like the devices 15 and 20 or not. Like Node 0, Node 1 can include one or more devices 130 and 132. The devices 130 and 132 can be CPUs, GPUs or other processors. If desired, the devices 130 and 132 can be implemented on a single substrate, such as, by way of an APU or other device. Preferably, the devices 130 and 132 function with shared virtual memory 135. The devices 130 and 132 can be running the software application 23 and the operating system software 24. It can be possible for one node, such as Node 0, to run the operating system 24 and another node, such as Node 1, to run the operating system 24 or even another type of operating system. The application 23 can include instructions stored in a non-transitory computer readable medium. The application 23 can be a high performance computing (HPC) application of the types described above. The device 130, while the application 23 is running, can execute at any moment in time multiple threads 137, 140 and 145, which can number one or more. The threads 137, 140 and 145 can be dedicated to communications and other threads (not shown) can be dedicated to computations. The thread 137 can be provided with a receive queue 150 and a free queue 155, the thread 140 can be provided with a receive queue 160 and a free queue 165 and the thread 145 can be provided with a receive queue 170 and a free queue 175. The device 140 can, like the device 20, include multiple workgroups 180, 185 and 190. The workgroup 180 can be provided with a receive queue 195 and a free queue 200, the workgroup 185 can be provided with a receive queue 205 and a free queue 210 and the workgroup 190 can be provided with a receive queue 215 and a free queue 220. In addition, Node 1 can execute a network thread 225, which can be provided with a receive queue 230 and a free queue 235. The network thread 225 can run on the devices 130 or 132 or even on a peripheral device or card (not shown).

Node N can similarly include multiple devices 240 and 245, which can be configured substantially like the devices 15 and 20 or not. Like Node 0, Node N can include one or more devices 240 and 245. The devices 240 and 245 can be CPUs, GPUs or other processors. If desired, the devices 240 and 245 can be implemented on a single substrate, such as, by way of an APU or other device. Preferably, the devices 240 and 245 function with shared virtual memory 135. The devices 240 and 245 can be running the software application 23 and the operating system software 24. The application 23 can include instructions stored in a non-transitory computer readable medium. The application 23 can be a high performance computing (HPC) application of the types described above. As with Nodes 0 and 1, the device 240 of Node N, while the application 23 is running, at any moment in time be executing threads 250, 255 and 260. The threads 250, 255 and 260 can be dedicated to communications and other threads (not shown) can be dedicated to computations. The thread 250 can be provided with a receive queue 265 and a free queue 270, the thread 255 can be provided with a receive queue 275 and a free queue 280 and the thread 260 can be provided with a receive queue 285 and a free queue 290. Like the devices 180 and 20, the device 245 can, at any moment in time, be executing multiple workgroups 295, 300 and 305. The workgroup 295 can be provided with a receive queue 310 and a free queue 315, the workgroup 300 can be provided with a receive queue 320 and a free queue 325 and the workgroup 305 can be provided with a receive queue 330 and a free queue 335. Finally, Node N can include a network thread 340 which can include a receive queue 345 and a free queue 350. The network thread 340 can run on the devices 240 or 245 or even on a peripheral device or card (not shown).

Internode communication is facilitated by a network 355, which can be a wireless, wired or some combination of the two. The network 355 can include various types of networking equipment such as routers, switches, etc.

The various messaging threads/workgroups, such as workgroups 70, 75 and 80 and threads 25, 30 and 35 can be dynamically generated. Alternatively, workgroups 70, 75 and 80 and threads 25, 30 and 35 can be persistent workgroups or multiple workgroups that multiplex on a predefined number of queues. Applications, when communications are necessary, will launch these persistent or multiple workgroups by making application program interface (API) calls (e.g., SEND, RECEIVE). In addition, one delegate GPU thread of say workgroup 70 can, on behalf of the entire workgroup 70, be responsible for dequeueing and enqueueing operations, and then the queue element can be broadcasted to the rest of the threads of that workgroup 70.

Figure 2:
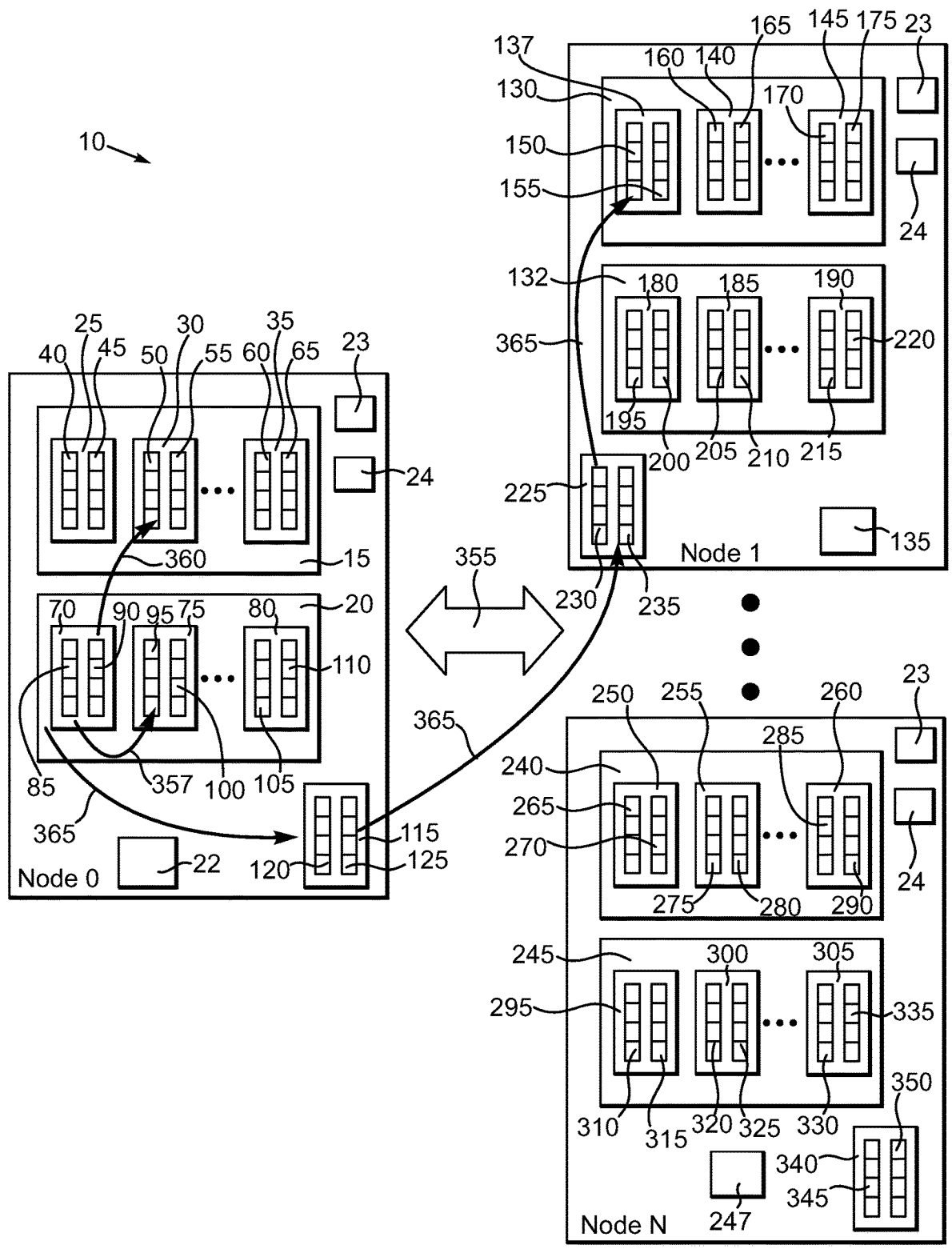
FIG. 2 is a block diagram like FIG. 1, but depicting some exemplary message traffic.

Exemplary intranode and internode messaging will now be described in conjunction with FIG. 2. The element numbers from FIG. 1 are repeated in FIG. 2. Two exemplary intranode messages 357 and 360 and one exemplary internode message 365 are schematically illustrated. The message 357 is both intranode and intradevice. For message 357, the message sender is the workgroup 70 and the message receiver is the workgroup 75. To send the message 357, the workgroup 70 dequeues an element (a queue portion schematically represented by the small rectangles of the free queue 90, receive queue 85 etc.) from the free queue 90, fills the element with the message information and enqueues the element onto the receive queue 95 of the workgroup 75. The workgroup 75 then dequeues the element and enqueues an element back to the free queue 90 of the workgroup 70 after processing the message 357. The message 360 is intranode but interdevice. For the message 360, the message sender is the workgroup 70 executing on the device 20 and the message receiver is the thread 30 executing on the device 15. To send the message 360, the workgroup 70 dequeues an element (i.e., a queue portion schematically represented by the small rectangles of the free queue 90, receive queue 85, etc.) from the free queue 90, fills the element with the message information and enqueues the element onto the receive queue 50 of the thread 30. The thread 30 then dequeues the element and enqueues an element back to the free queue 90 of the workgroup 70 after processing the message 360. The message 365 is internode. For message 365, the message sender is the workgroup 70 and the message receiver is the thread 137 executing on the device 130 of Node 1. For internode communications, the sender (e.g., the workgroup 70) will first communicate with the network thread 115 on its own node, Node 0, which is responsible for communicating with the network thread 225 on the receiving node, Node 1, which in-turn, communicates with the receiving thread 137. Depending on the sizes of messages, the actual message 365 can be a part of the queue element, or the queue element includes a pointer for the location of the message 365. The sender, the workgroup 70, and the local network thread 115 perform enqueueing and dequeueing using the free queue 90 and the receive queue 120 like the enqueueing and dequeueing operations described above for intranode messaging. The thread 137 (the receiver), and its local network thread 225 perform enqueueing and dequeueing using the receive queue 150 and the free queue 235 like the enqueueing and dequeueing operations described above for intranode messaging. Similarly, the passing of the message 365 between the network threads 115 and 225 involves enqueueing and dequeueing using the free queue 125 and the receive queue 230 like the enqueueing and dequeueing operations described above, albeit here for internode messaging. In lieu of the double queue (send and receive) variant just described, message traffic could be managed using single queues. Here, one end of a single queue could be set aside for dequeue operations and the other end of the queue could be set aside for enqueue operations.

Figure 3:
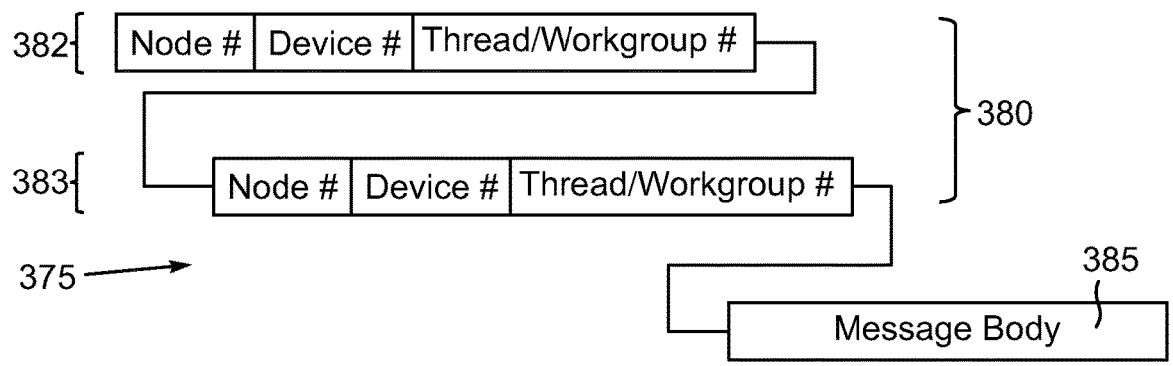
FIG. 3 is a block diagram depicting an exemplary generic message format.
Figure 4:
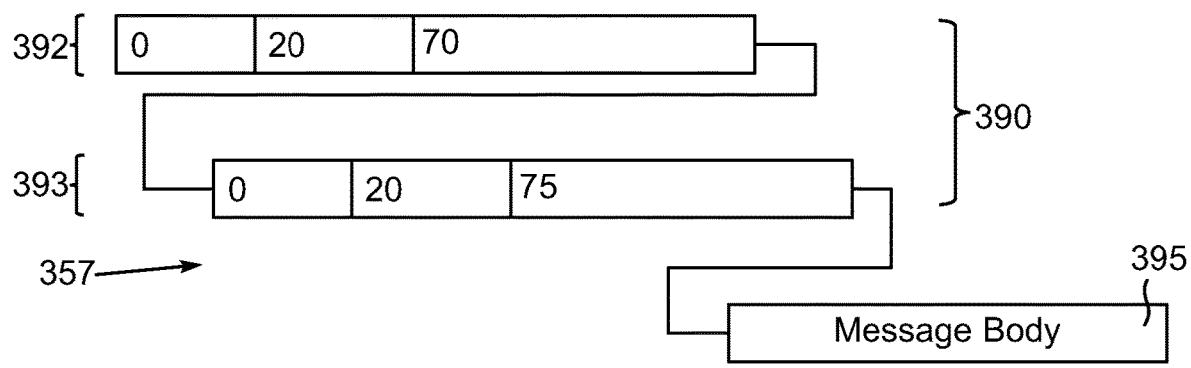
FIG. 4 is a block diagram depicting a few exemplary messages.
Figure 4:
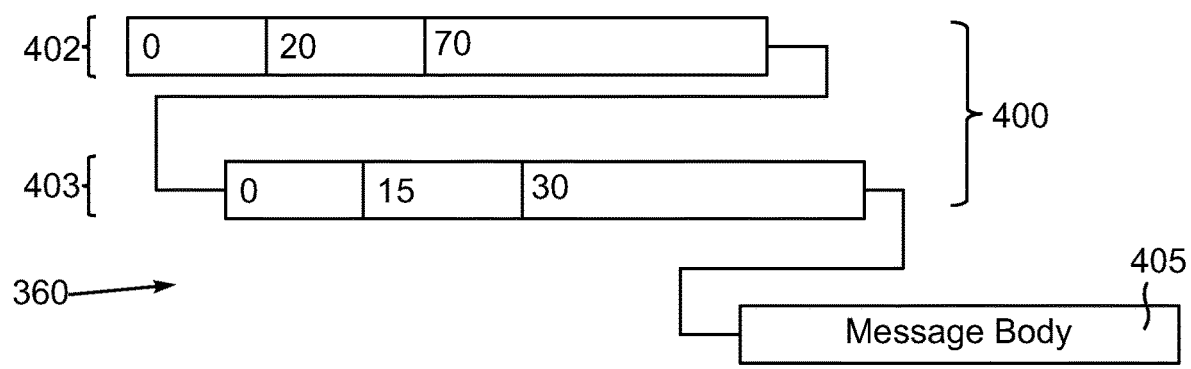
Figure 4:
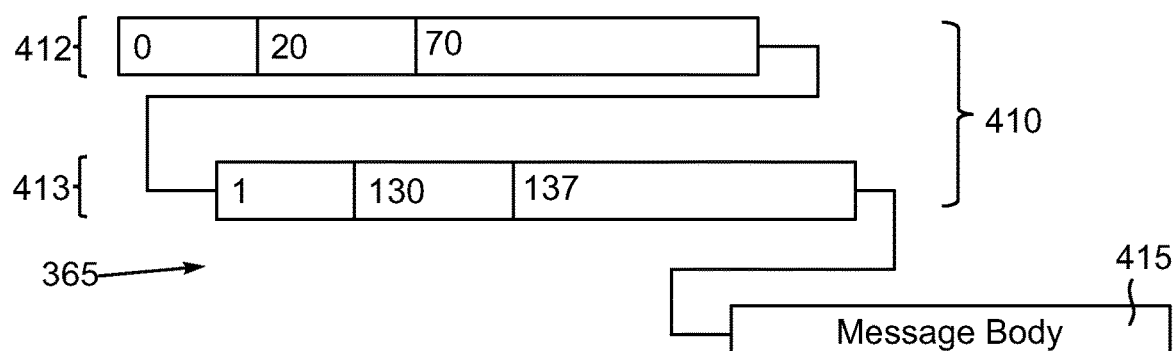

The disclosed variants provide concurrent capabilities for intranode (intradevice and interdevice) and internode message passing in a heterogeneous computing environment. As noted in the Background section above, in traditional MPI settings, messaging in heterogeneous computing environments is achieved by using rank numbers (a unique number for a thread/process). However, the disclosed variants instead identify different threads/processes, and thus senders/receivers, in hierarchical architectures, using a new domain decomposition descriptor to enhance the rank approach. A generic message 375 is depicted in FIG. 3. The message 375 includes a domain descriptor 380 that includes a sender domain 382 and a receiver domain 383. In addition, the message 375 includes a message body 385. The domain description 380 is a 2m-wide vector that hierarchically identifies the source and destination of a message where m is the width or number hierarchies. The size of 2m depends on the number of hierarchies (i.e., nodes, devices, etc.) in the computing system 10. For computing network 10 depicted in FIGS. 1 and 2, there are three levels, so the domain descriptor 380 consists of Node Number, Device Number and Thread/Workgroup Number for both the sender domain 382 and the receiver domain 383. Now consider the message 357, which is depicted schematically in FIG. 4 using the same format as FIG. 3, and is destined for the workgroup 75 executing on device 20. Thus for the message 357, the domain descriptor 390 includes a sender domain 392 with Node Number=0, Device Number=20 and Thread/Workgroup Number=70 or {0, 20, 70} for short, and a receiver domain 393 with Node Number=0, Device Number=20 and Thread/Workgroup Number=75, or {0, 20, 75} for short. The message body 395 can have virtually any content. Now consider the message 360, which is destined for the thread 30 executing on the device 30. For the message 360, the domain descriptor 400 includes a sender domain 402 with Node Number=0, Device Number=20 and Thread/Workgroup Number=70, or {0, 20, 70} for short, and a receiver domain 403 with Node Number=0, Device Number=15 and Thread/Workgroup Number=30, or {0, 15, 30} for short. The message body 405 can have virtually any content. Now consider the message 365, which is destined for the thread 137 executing on the device 130 in Node 1. For the message 365, the domain descriptor 410 includes a sender domain 412 with Node Number=0, Device Number=20 and Thread/Workgroup Number=70 or {0, 20, 70} for short, and a receiver domain 413 with Node Number=1, Device Number=130 and Thread/Workgroup Number=137, or {1, 130, 137} for short. The message body 415 can have virtually any content. Optionally, sender and receiver descriptors (e.g., 392 and 393) could be other than numbers where each digit represents a domain level. For example, a single number could used to identify a sender or receiver by using a lookup table that maps a number to a sender or receiver. The operating system 24 and perhaps the runtime software (the application 23) will first detect the system topology at the initialization step and assign the particular identification numbers, e.g. Node Number and Device Number. Workgroup IDs and thread IDs can be provided by a multi-threading library, which can be part of the application as described below, and the runtime software (the application 23) itself.

Besides numbering, the domain descriptors 390, 400 and 410 show relationships, e.g., a node, such as Node 0, includes devices 15 and 20, which further include threads/workgroups. The programmers can specify this domain descriptor when performing network communications (e.g., SEND). Alternatively, sender/receiver identification can be made compatible to the rank model. For example, the system software 24 can implement a table storing the mapping of each rank number and each domain descriptor 390, 400 and 410; thus the domain descriptors 390, 400 and 410 are transparent to users in this case.

For the three scenarios represented by the messages 357, 360 and 365, the application software 23 can make optimizations that leverage HSA memory scopes. Memory scopes are used to limit the visibility of a memory operation to specific hardware processing elements. Memory scopes define memory-ordering constraints, which apply respectively to a single work-item, such as a thread 30, to multiple work-items in a work-group 75, to work-items/threads 250, 255 and 260 on a single device 240, and work-items 137, 140, 145, 180, 185 and 190 across multiple devices 130 and 132 when using shared virtual memory 135. Depending on memory scopes, underlying hardware optimizations are possible by improving the cache coherence which leads to different performance. Using Node 0 as an example, if threads within a workgroup 70 communicate, they are only required to synchronize within the local cache per-compute unit or core (CU) (i.e., workgroup scope). If threads across CUs communicate, it has to be through L2 cache and/or inter-CU L1 cache coherence (i.e., device scope). In the case of communications between CPU threads, say threads 25, 30 and 35, GPU threads/workgroups 70, 75 and 80, then platform-level coherence (i.e., platform scope) is needed e.g., through the Node 0 memory controller.

It should be understood that multiple concurrent enqueues can occur (but dequeues are local), thus locking and lock-free operations for queues should be used to avoid races. The implementation of these enqueueing operations can include atomic operations that manipulate queue head and tail pointers. When atomic operations are used, they can be labeled with different memory scopes to improve performance. Atomics are instructions for memory reading and writing written in such a way as to enable a processor, thread or workgroup to read and write to memory while other entities (processor, threads, workgroups, I/O devices) are prevented from accessing that memory until the operation is complete. HSA includes standards for atomics instructions for various operations, such as load from memory, store to memory, fetch from memory, apply logic operation with one additional operand, and store back and other operations.

The decision of which memory scope to use can be determined by the domain descriptors 390, 400 and/or 410 when a thread/workgroup performs a SEND, i.e., sends the messages 357, 360 and/or 365. Attention is turned to FIGS. 2 and 3. For message 357, workgroup 70 sends the message 357 to another workgroup, workgroup 75, on the same device, device 20. The domain descriptor 392 for the sender is {0, 20, 70}, while the domain descriptor 393 for the destination or receiver is {0, 20, 75}. The computing network 10 determines that both source and destination are on the same node and same device. Therefore, the atomic enqueue of the SEND instruction (to send the message 357) by workgroup 70 will use a device-scope version of the SEND instruction. Now consider the message 360. For message 360, workgroup 70 sends the message 360 to another thread/workgroup, thread 30, on a different device 15, but in the same node, Node 0. The domain descriptor 402 for the sender is {0, 20, 70}, while the domain descriptor 403 for the destination or receiver is {0, 15, 30}. The computing network 10 determines that both source and destination are on the same node, Node 0, but on different devices, devices 15 and 20. Therefore, the atomic enqueue of the SEND instruction (to send the message 360) by workgroup 70 will be a platform scope operation. The message 365 presents a slightly different situation. Here, the message 365 is sent across the network 355. Depending on different solutions (e.g., whether the network queue is registered at the same virtual address space of CPU and GPU queues), either platform scope is used or a bigger network scope can be implemented.

To sum up, all the threads/workgroups 25, 30, 70, 75, 295, 300, etc., in the computing network 10 will view the underlying communication system in a universal way whether the messages 357, 360 and 365 are interdevice, intranode or internode. In addition, the combined domain descriptor and HSA memory scopes can optimize the message passing for different scenarios. This allows more applications written for the message passing model to run a heterogeneous machine cluster or computing network 10.

Figure 5:
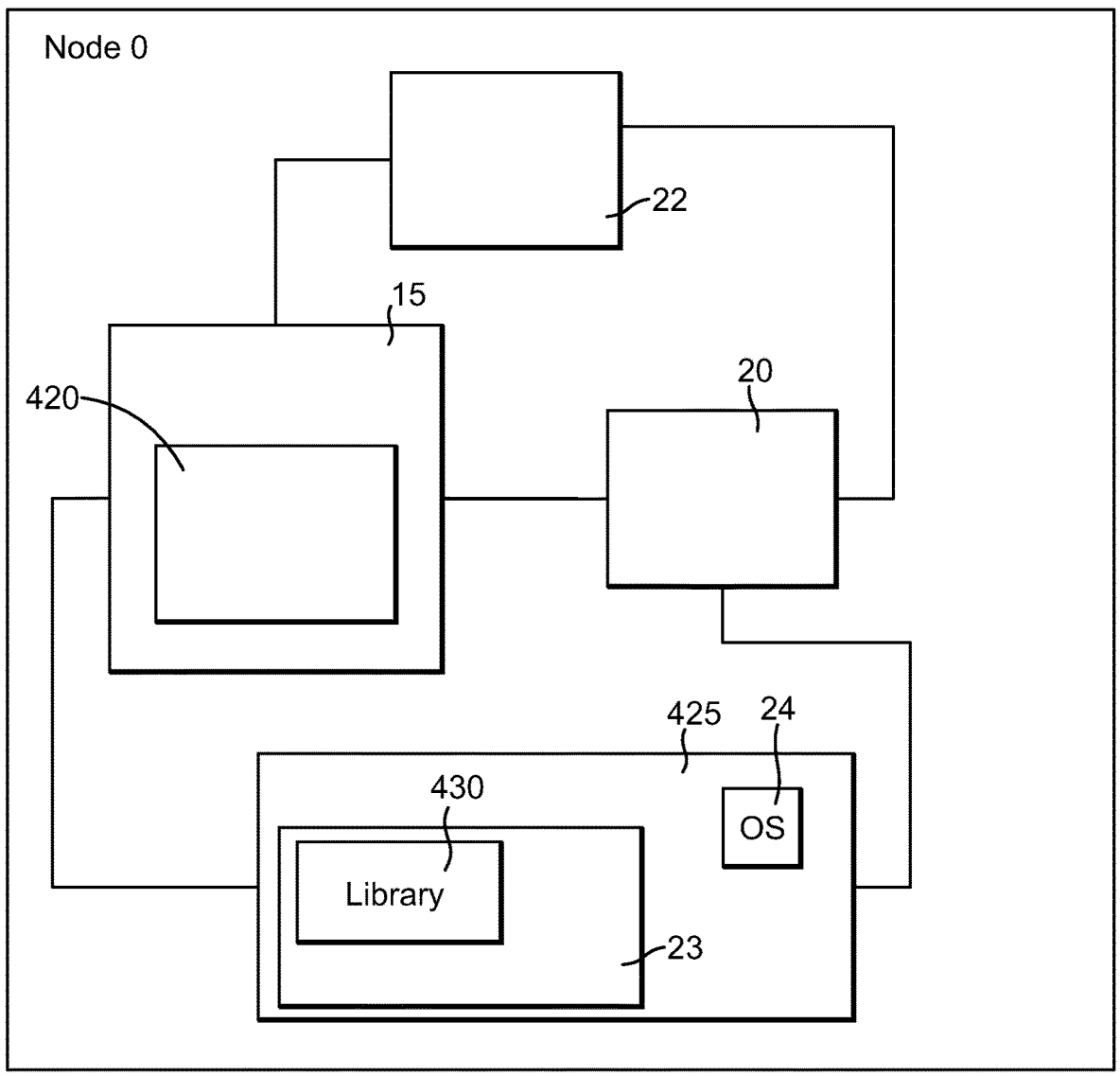
FIG. 5 is a block diagram depicting an exemplary computing node of the computing network.

Some additional details of the nodes, Node 0 . . . Node N, of the computing network depicted in FIGS. 1 and 2, will now be described in conjunction with the block diagram depicted in FIG. 5. The following description of Node 0 will be illustrative of other nodes, Node 1 and Node N. As noted above, Node 0 can include devices 15 and 20. If implemented as a CPU, the device 15 can include a memory controller 420, which implements addressing of the shared virtual memory 22. The high performance computing application 23 and the operating system software 24 can be stored as instructions and data on a storage device 425, which can be a non-transitory computer readable medium. Examples include hard drives, optical drives, non-volatile memory or the like. The application 23 can include one or more libraries 430. The library(s) 430 include instructions to implement the exemplary messaging techniques disclosed herein, including instructions written using atomics and memory scopes. Different libraries 430 can be written for various types of applications 23 and hardware configurations.

Figure 6:
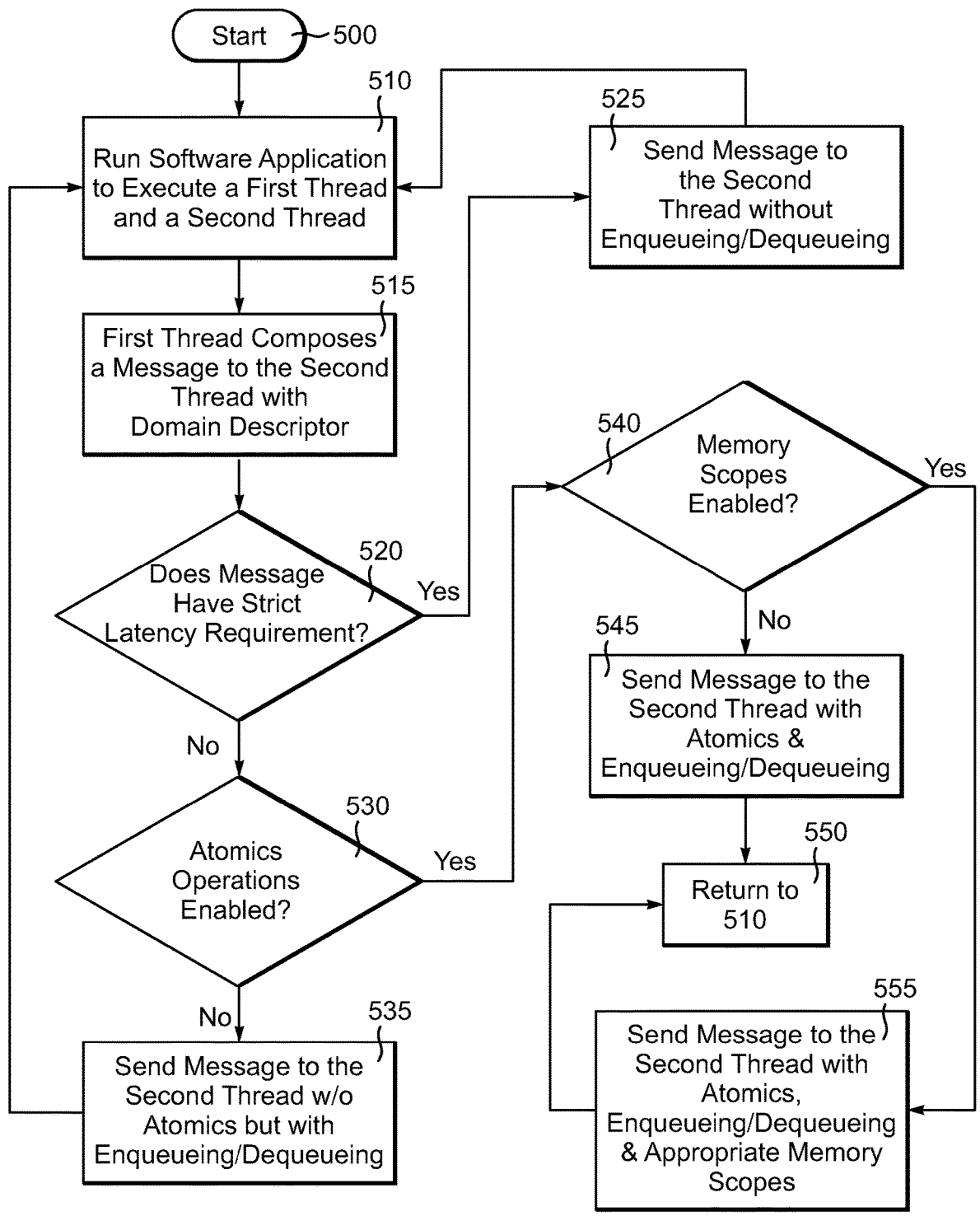
FIG. 6 is a flow chart depicting some exemplary messaging operations.

An exemplary process flow for message traffic can be understood by referring now to the flow chart depicted in FIG. 6. After process start at step 500, at step 510 a software application is run to execute a first thread and a second thread. This can correspond to, for example, the running of the software application 23 and the execution of threads/work groups 70 and 75, for example. At step 515, the first thread composes a message to the second thread with an appropriate domain descriptor. Again this can correspond to any of the message composition between threads, work groups, etc. disclosed herein. At step 520, a conditional, a determination is made prior to message transmission whether the message has a strict latency requirement. For example, the message by way of the domain descriptor message body or otherwise, can include a flag that indicates that the message is not appropriate for the enqueueing and dequeueing operations described elsewhere herein and is thus slated for immediate and direct transmission to a receiver. Thus, at step 520, if it is determined that the message does have a strict latency requirement, then at step 525 the message is sent from the first thread to the second thread without enqueueing and dequeueing operations. Step 525 is followed by a return to step 510. If, however, at step 520 it is determined that the message does not have a strict latency requirement then a second conditional at step 530 is encountered. At step 530, if atomics operations are not enabled, then at step 535 the message is sent to the second thread without atomics but with enqueueing/dequeueing operations that is followed by a return to step 510. If, however, at step 530 atomics operations are enabled then the process proceeds to step 540 and another conditional. At step 540, if memory scopes are not enabled, then at step 545 the message is sent to the second thread with both atomics and enqueueing/dequeueing but not memory scopes. At 550 the process returns to step 510. If, however, at step 540 memory scopes are enabled then at step 555 the message is sent to the second thread with atomics, enqueueing/dequeueing and appropriate memory scopes. Thereafter, a return is made to step 550 and thus back to 510. These operations can be repeated continuously and many times per second depending upon the type of application being run.

While the invention can be susceptible to various modifications and alternative forms, specific variants have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computing node, comprising:
   a first device operable to run a software application, and while running the software application, to execute a first thread; and wherein the software application includes instructions for sending a message from the first thread to a second thread, the message including a domain descriptor that hierarchically identifies a first location of the first thread and a second location of the second thread.

2. The computing node of claim 1, wherein the second thread executes on the first device.

3. The computing node of claim 2, wherein the first device comprises a shared virtual memory, the first thread is provided with a free queue and a receive queue as components of the shared virtual memory and the second thread is provided with a free queue and a receive queue as components of the shared virtual memory, the instructions for sending the message comprising the first thread dequeueing a queue element from its free queue, the first thread filling the element with the message, the first thread enqueueing the element onto the receive queue of the second thread, the second thread dequeueing the element and, after processing the message, enqueueing another element back to the free queue of the first thread.

4. The computing node of claim 1, wherein the second thread executes on a second device of another computing node.

5. The computing node of claim 4, wherein the first device comprises a shared virtual memory and the another computing node comprises another shared virtual memory, the first thread is provided with a free queue and a receive queue as components of the shared virtual memory and the second thread is provided with a free queue and a receive queue as components of the another shared virtual memory, the instructions for sending the message comprising the first thread dequeueing a queue element from its free queue, the first thread filling the element with the message, the first thread enqueueing the element onto the receive queue of the second thread, the second thread dequeueing the element and, after processing the message, enqueueing another element back to the free queue of the first thread.

6. The computing node of claim 1, wherein the first device comprises a graphics processing unit operable to execute multiple workgroups wherein each of the workgroups includes one or more wavefronts, the first thread being part of one of the wavefronts.

7. The computing node of claim 1, comprising a shared virtual memory, the first thread is provided with a free queue and a receive queue as components of the shared virtual memory and the second thread is provided with a free queue and a receive queue as components of the shared virtual memory, the instructions for sending the message comprising the first thread sending the message without enqueueing a queue element from its free queue onto the receive queue of the second thread when the message has a latency requirement.

8. The computing node of claim 7, wherein the latency requirement is indicated by way of the domain descriptor or message body of the message.

9. The computing node of claim 1, wherein the first device comprises a shared virtual memory, the first thread is provided with a free queue and a receive queue as components of the shared virtual memory and the second thread is provided with a free queue and a receive queue as components of the shared virtual memory, the instructions for sending the message comprising, with atomics operations commands, the first thread dequeueing a queue element from its free queue, the first thread filling the element with the message, the first thread enqueueing the element onto the receive queue of the second thread, the second thread dequeueing the element and, after processing the message, enqueueing another element back to the free queue of the first thread.

10. The computing node of claim 1, wherein the first device comprises a shared virtual memory, the first thread is provided with a free queue and a receive queue as components of the shared virtual memory and the second thread is provided with a free queue and a receive queue as components of the shared virtual memory, the instructions for sending the message comprising, with atomics operations commands and memory scopes enabled, the first thread dequeueing a queue element from its free queue, the first thread filling the element with the message, the first thread enqueueing the element onto the receive queue of the second thread, the second thread dequeueing the element and, after processing the message, enqueueing another element back to the free queue of the first thread.

11. The computing node of claim 10, wherein the memory scopes comprise device scope or platform scope.

12. The computing node of claim 1, comprising a memory, interconnects and a network interface card.

13. The computing node of claim 1, wherein the first device comprises a central processing unit, a graphics processing unit, an accelerated processing unit or a system-on-chip.

14. A computing node, comprising:
a first device operable to run a software application, and while running the software application, to execute a first thread and a second thread;
a second device operable to execute a third thread; and
wherein the software application includes instructions for sending a message from the first thread to the second thread and/or to the third thread, the message including a domain descriptor that hierarchically identifies a first location of the first thread and a second location of the second thread and/or a third location of the third thread.

15. The computing node of claim 14, wherein the first device and the second device comprise a central processing unit, a graphics processing unit, an accelerated processing unit or a system-on-chip.

16. The computing node of claim 14, comprising a memory, interconnects and a network interface card.

17. A method of computing, comprising:
executing a first thread, a second thread, and a third thread;
sending a message from the first thread to the second thread and the third thread; and
wherein the message includes a domain descriptor that hierarchically identifies a first location of the first thread, a second location of the second thread, and a third location of the third thread.

18. The method of claim 17, wherein the message is sent from the first thread to the second thread and the third thread using atomics operations commands.

19. The method of claim 18, wherein the atomics operations commands include usage of memory scopes, the memory scopes including device scopes and platform scopes.

20. The method of claim 19, wherein selection of the memory scopes is based on the hierarchic identification of the first and second locations.

21. The method of claim 17, comprising using a shared virtual memory, providing the first thread with a free queue and a receive queue as components of the shared virtual memory and providing the second thread with a free queue and a receive queue as components of the shared virtual memory or another shared virtual memory, the instructions for sending the message comprising the first thread sending the message without enqueueing a queue element from its free queue onto the receive queue of the second thread when the message has a latency requirement.

\* \* \* \* \*